United States Patent
Yoo

(10) Patent No.: US 11,631,255 B2
(45) Date of Patent: Apr. 18, 2023

(54) APPARATUS AND METHOD FOR CONTROLLING DOOR OPENING

(71) Applicants: HYUNDAI MOTOR COMPANY, Seoul (KR); KIA MOTORS CORPORATION, Seoul (KR)

(72) Inventor: Min Kyun Yoo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 388 days.

(21) Appl. No.: 16/915,042

(22) Filed: Jun. 29, 2020

(65) Prior Publication Data

US 2021/0264172 A1 Aug. 26, 2021

(30) Foreign Application Priority Data

Feb. 21, 2020 (KR) .......................... 10-2020-0021456

(51) Int. Cl.
| | |
|---|---|
| *G06V 20/58* | (2022.01) |
| *E05C 17/00* | (2006.01) |
| *G01S 13/931* | (2020.01) |
| *B60Q 9/00* | (2006.01) |
| *G08B 21/18* | (2006.01) |

(52) U.S. Cl.
CPC ............ *G06V 20/58* (2022.01); *B60Q 9/008* (2013.01); *E05C 17/006* (2013.01); *G01S 13/931* (2013.01); *G08B 21/18* (2013.01); *E05Y 2400/54* (2013.01); *E05Y 2900/531* (2013.01); *G01S 2013/9314* (2013.01)

(58) Field of Classification Search
CPC ................. G01S 13/931; G01S 17/931; G01S 2013/9314; G01S 2013/9318
USPC ............................... 342/70; 701/49, 301, 53
See application file for complete search history.

(56) References Cited

U.S. PATENT DOCUMENTS

| | | | | |
|---|---|---|---|---|
| 7,450,738 | B2 * | 11/2008 | Decker ................. | G01S 13/931 382/104 |
| 7,843,767 | B2 * | 11/2010 | Hayasaka ........... | G01S 7/52004 367/99 |
| 8,232,893 | B2 * | 7/2012 | Endo ....................... | G01S 17/86 340/908 |
| 8,280,593 | B2 * | 10/2012 | Nakakura ............... | E05F 15/43 701/49 |
| 8,938,337 | B2 * | 1/2015 | Nakakura ............... | G01S 17/42 701/1 |
| 10,106,153 | B1 * | 10/2018 | Xiao ........................ | G08G 1/14 |
| 10,239,521 | B1 * | 3/2019 | Xiao .................... | G05D 1/0278 |

(Continued)

*Primary Examiner* — Erin F Heard
*Assistant Examiner* — Michael W Justice
(74) *Attorney, Agent, or Firm* — Slater Matsil, LLP

(57) ABSTRACT

A door opening control apparatus and a door opening control method thereof are provided. The door opening control apparatus includes a recognizer configured to recognize a surrounding obstacle based on sensor recognition information received from a plurality of sensors, a determiner configured to calculate a maximum opening angle of a door for preventing collision with the recognized surrounding obstacle and to determine a risk of collision between the door and the surrounding obstacle based on the calculated maximum opening angle, and a controller configured to control an opening angle of the door to prevent the door from colliding with the surrounding obstacle when determining that the risk of collision is present.

20 Claims, 15 Drawing Sheets

(56) References Cited

U.S. PATENT DOCUMENTS

| | | | | |
|---|---|---|---|---|
| 10,703,360 B2* | 7/2020 | Kojo | ................ | G06V 20/64 |
| 10,717,432 B2* | 7/2020 | Krekel | ................ | G06V 20/586 |
| 10,832,064 B2* | 11/2020 | Hirai | ................ | G08G 1/143 |
| 10,836,379 B2* | 11/2020 | Xiao | ................ | B60W 30/00 |
| 11,158,192 B2* | 10/2021 | Unverdorben | ................ | G01S 7/41 |
| 11,313,167 B2* | 4/2022 | Akbarian | ................ | G01S 13/931 |
| 11,435,441 B2* | 9/2022 | Hurd | ................ | E05F 15/43 |
| 11,531,354 B2* | 12/2022 | Tsurumi | ................ | G05D 1/0219 |
| 2007/0030347 A1* | 2/2007 | Decker | ................ | G01S 13/931 |
| | | | | 348/135 |
| 2008/0232198 A1* | 9/2008 | Hayasaka | ................ | G01S 7/52004 |
| | | | | 367/99 |
| 2009/0174574 A1* | 7/2009 | Endo | ................ | G01S 17/86 |
| | | | | 340/932.2 |
| 2010/0076651 A1* | 3/2010 | Nakakura | ................ | E05C 17/00 |
| | | | | 701/49 |
| 2010/0228448 A1* | 9/2010 | Nakakura | ................ | E05F 15/43 |
| | | | | 701/49 |
| 2017/0334353 A1* | 11/2017 | Gillott | ................ | B62D 15/0285 |
| 2018/0354504 A1* | 12/2018 | Kojo | ................ | G06V 10/44 |
| 2019/0291720 A1* | 9/2019 | Xiao | ................ | G06F 18/24 |
| 2020/0018111 A1* | 1/2020 | Akbarian | ................ | E05F 15/73 |
| 2020/0049511 A1* | 2/2020 | Sithiravel | ................ | G01C 21/28 |
| 2020/0104613 A1* | 4/2020 | Hirai | ................ | G06V 10/48 |
| 2020/0284876 A1* | 9/2020 | Hurd | ................ | G01S 7/415 |
| 2020/0409387 A1* | 12/2020 | Tsurumi | ................ | G05D 1/0238 |
| 2021/0174682 A1* | 6/2021 | Unverdorben | ................ | G01S 13/931 |

* cited by examiner

APPARATUS AND METHOD FOR CONTROLLING DOOR OPENING

CROSS-REFERENCE TO RELATED APPLICATION

The present application claims priority to and the benefit of Korean Patent Application No. 10-2020-0021456, filed on Feb. 21, 2020, which is hereby incorporated by reference in its entirety.

TECHNICAL FIELD

The present disclosure relates to a door opening control apparatus for a vehicle, and a door opening control method.

BACKGROUND

Recently, due to a sudden increase in vehicles, parking facilities for parking or stopping a vehicle have been very insufficient and a parking space has also been very narrow.

As such, the size of a parking section has not been increased due to a limited infrastructure of a parking space of a parking lot.

In contrast, the width and length of a recently released vehicle are increased compared with a previous vehicle, and thus, a door of a subject vehicle frequently collides with a surrounding obstacle or another vehicle when the door is open after the vehicle is parked.

A passenger inside a vehicle determines a surrounding situation with his or her eyes only and opens a door, and thus, is not capable of accurately recognizing the surrounding situation, and the door frequently collides with surrounding obstacles.

Such collision due to door opening damages outer appearances of subject and other vehicles, and also becomes a social problem due to disagreement between drivers.

Thus, in order to prevent collision due to door opening, an impact absorber such a protection pad or sponge is attached to a door surface, but it may be difficult to effectively protect a door due to a narrow protection range and the protection pad is detached due to degraded adhesion.

Accordingly, a door opening control apparatus for accurately recognizing a surrounding situation of a subject vehicle and controlling a door opening degree may be desired to prevent collision with a surrounding obstacle due to door opening.

The statements in this section merely provide background information related to the present disclosure and may not constitute prior art.

SUMMARY

Accordingly, the present disclosure is directed to a door opening control apparatus and a door opening control method thereof for preventing collision with a surrounding obstacle as a door of a subject vehicle is open by determining a risk of collision between the door and a surrounding obstacle based on a maximum opening angle of the door for preventing collision with the surrounding obstacle and controlling an opening angle of the door.

To achieve these objects and other advantages and in accordance with the purpose of the present disclosure, as embodied and broadly described herein, an apparatus for controlling door opening includes a recognizer configured to recognize a surrounding obstacle based on sensor recognition information received from a plurality of sensors, a determiner configured to calculate a maximum opening angle of a door for preventing collision with the recognized surrounding obstacle and to determine a risk of collision between the door and the surrounding obstacle based on the calculated maximum opening angle, and a controller configured to control an opening angle of the door to prevent the door from colliding with the surrounding obstacle when determining that the risk of collision is present.

In another aspect of the present disclosure, a method of controlling door opening of a door opening control apparatus including a recognizer, a determiner, and a controller includes recognizing a surrounding obstacle based on sensor recognition information received from a plurality of sensors, by the recognizer, calculating a maximum opening angle of a door for preventing collision with the recognized surrounding obstacle, by the determiner, determining a risk of collision between the door and the surrounding obstacle based on the calculated maximum opening angle, by the determiner, and controlling an opening angle of the door to prevent the door from colliding with the surrounding obstacle when determining that the risk of collision is present, by the controller.

In another aspect of the present disclosure, a computer-readable recording medium having recorded thereon a program for executing a door opening control method of a door opening control apparatus may perform procedures provided in the door opening control method of the door opening control apparatus.

In another aspect of the present disclosure, a vehicle includes a radar configured to sense a surrounding obstacle of a subject vehicle, and a door opening control apparatus configured to determine a risk of collision between a door and the surrounding obstacle based on a maximum opening angle of the door for preventing collision with the surrounding obstacle and to control an opening angle of the door, wherein the door opening control apparatus includes a recognizer configured to recognize the surrounding obstacle based on sensor recognition information received from the radar, a determiner configured to calculate a maximum opening angle of the door for preventing collision with the recognized surrounding obstacle and to determine the risk of collision between the door and the surrounding obstacle based on the calculated maximum opening angle, and a controller configured to control an opening angle of the door to prevent the door from colliding with the surrounding obstacle when determining that the risk of collision is present.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
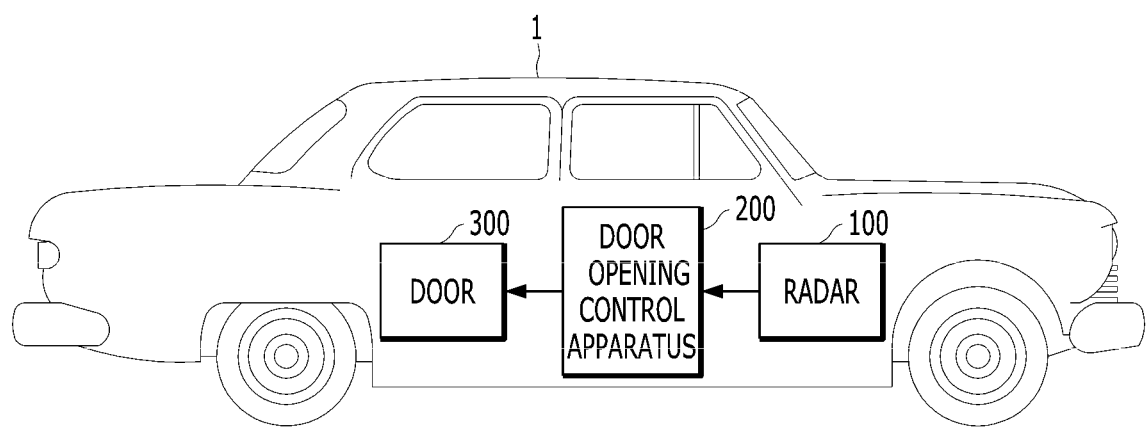
FIG. 1 is a diagram for explaining a vehicle including a door opening control apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings so as to be easily implemented by those skilled in the art. However, the present disclosure may be variously implemented and is not limited to the forms described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The terms "unit", "-or/er" and "module" described in the specification indicate a unit for processing at least one function or operation, which may be implemented by hardware, software or a combination thereof.

Hereinafter, an apparatus and method for controlling door opening in some forms of the present disclosure will be described in detail with reference to FIGS. 1 to 10.

FIG. 1 is a diagram for explaining a vehicle including a door opening control apparatus in some forms of the present disclosure.

As shown in FIG. 1, the vehicle according to the present disclosure may include a radar 100 for sensing a surrounding obstacle of a subject vehicle 1, and a door opening control apparatus 200 for determining a risk of collision between the door 300 and a surrounding obstacle based on a maximum opening angle of a door 300 in order to prevent collision with the surrounding obstacle and controlling an opening angle of the door 300.

Here, the radar 100 may be installed at a front side and rear side of the subject vehicle 1 and may sense a surrounding obstacle of the subject vehicle 1.

For example, the radar 100 may be classified into a first radar group positioned to the right of the subject vehicle and a second radar group positioned to the left of the subject vehicle based on a longitudinal reference line passing through the center of a bumper of the subject vehicle 1.

The first and second radar groups may have a detection region including sectors #0 to #55 but are the present disclosure is not limited thereto.

Here, among the sectors #0 to #55 in the detection region, sectors #0 to #19 may be separated at an interval of a distance of about 0.5 m and sectors #22 to #55 may be separated at an interval of an angle of about 2.5 degrees, but the present disclosure is not limited thereto.

Then, the door opening control apparatus 200 may receive sensor recognition information from a plurality of sensors, may generate a free space-based occupancy grid map (OGM) based on the sensor recognition information, and may extract a contour of a stationary obstacle from the OGM to recognize the surrounding obstacle.

Here, when extracting the contour, the door opening control apparatus 200 may cluster grids having a predetermined threshold value and may group the grids to one set based on a probability reference of the OGM, and may connect grids corresponding to one grouping target to each other to extract the contour of the stationary obstacle.

As necessary, when recognizing a surrounding obstacle, the door opening control apparatus 200 may receive sensor recognition information from a plurality of sensors, may generate a free space-based occupancy grid map (OGM) based on the sensor recognition information, may predict a position of a subject vehicle on which automatic parking is completed, may extract a contour of a stationary obstacle at the predicted position of the subject position from the OGM, and may recognize the surrounding obstacle at the predicted position of the subject vehicle.

When calculating a maximum opening angle of the door 300, the door opening control apparatus 200 may extract coordinate information on a contour point from the contour of the surrounding obstacle, and may calculate a maximum opening angle of a door for preventing collision with the surrounding obstacle based on the extracted coordinate information on the contour point and coordinate information on an end point of a door, corresponding to an opening angle of the door.

Then, when determining a risk of collision between the door 300 and the surrounding obstacle, the door opening control apparatus 200 may define the calculated maximum opening angle as a maximum value of a collision risk degree, and may set a threshold value of the collision risk degree based on the maximum value of the collision risk degree, and when an opening angle of a door is equal to or greater than a threshold value, a risk of collision between the door and the surrounding obstacle may be present.

As necessary, when determining a risk of collision between the door 300 and the surrounding obstacle, the door opening control apparatus 200 may predict a position of a subject vehicle on which automatic parking is completed, may calculate a maximum opening angle of a door for preventing collision with the surrounding obstacle at the predicted position of the subject vehicle, and may determine a risk of collision between the door and the surrounding obstacle based on the calculated maximum opening angle.

When determining that a risk of collision is present, the door opening control apparatus 200 may control an opening angle of the door at a safe angle to prevent the door from colliding with the surrounding obstacle as well as a warning horn.

As necessary, when determining that a risk of collision between the door and the surrounding obstacle at the predicted position of the subject vehicle is present, the door opening control apparatus 200 may also provide notification indicating that a passenger is not capable of getting off or is allowed to previously get off.

As such, according to the present disclosure, when a contour is extracted using a free space of a radar, a surrounding situation may be accurately recognized, and thus, when a passenger opens a door up to a time point at which collision between the door and an obstacle occurs, additional opening of the door may be automatically limited together a warning horn prior to the time point at which collision is predicted, thereby preventing the vehicle from being damaged.

According to the present disclosure, when the automatic parking system is operated, if the door is not open by a degree corresponding to a space for allowing a passenger to get off after a vehicle is parked in a region of a contour-based parking space, notification indicating that a passenger is allowed to previously get off or notification indicating that it is difficult to open a door and the passenger is not capable of getting off after the vehicle is completely parked may be previously provided to the passenger, thereby enhancing convenience.

Figure 2:
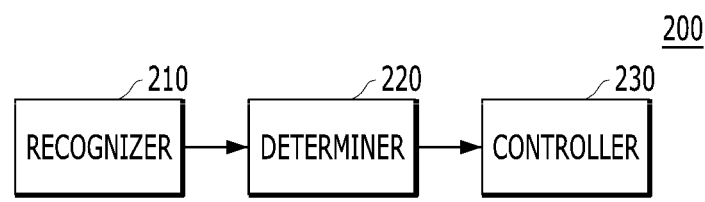
FIG. 2 is a block diagram showing a configuration of a door opening control apparatus in one form of the present disclosure.

FIG. 2 is a block diagram showing a configuration of a door opening control apparatus in some forms of the present disclosure.

As shown in FIG. 2, the door opening control apparatus 200 according to the present disclosure may include a recognizer 210 for recognizing a surrounding obstacle based on sensor recognition information received from a plurality of sensors, a determiner 220 for calculating a maximum opening angle of a door for preventing collision with the recognized surrounding obstacle and determining a risk of collision between the door and the surrounding obstacle based on the calculated maximum opening angle, and a controller 230 for controlling an opening angle of the door to prevent the door from colliding with the surrounding obstacle when determining that the risk of collision is present.

The recognizer 210 may receive sensor recognition information from a plurality of sensors, may generate a free space-based occupancy grid map (OGM) based on the sensor recognition information, and may extract a contour of a stationary obstacle from the OGM to recognize a surrounding obstacle.

Here, when receiving the sensor recognition information, the recognizer 210 may receive the sensor recognition information from a plurality of radars installed at a front side and rear side of the subject vehicle.

The recognizer 210 may recognize a position of a detection point based on distance information and sector information of a radar.

When generating the OGM, the recognizer 210 may convert a region around the subject vehicle into a map including grids with a predetermined size to generate the OGM.

For example, when the size of the region around the subject vehicle is about 10 m×about 10 m, the recognizer 210 may convert the region into grids with a size of about 0.25 m×about 0.25 m to generate the OGM.

Then, when extracting a contour, the recognizer 210 may cluster grids having a predetermined threshold value and may group the grids to one set based on a probability reference of the OGM, and may connect grids corresponding to one grouping target to each other to extract the contour of the stationary obstacle.

As necessary, when the automatic parking system is executed, if the recognizer 210 recognizes a surrounding obstacle, the recognizer 210 may receive sensor recognition information from a plurality of sensors, may generate a free space-based occupancy grid map (OGM) based on the sensor recognition information, may predict a position of a subject vehicle on which automatic parking is completed, may extract a contour of a stationary obstacle at the predicted position of the subject position from the OGM, and may recognize the surrounding obstacle at the predicted position of the subject vehicle.

Then, when calculating a maximum opening angle of a door, the determiner 220 may extract coordinate information on a contour point from the contour of the surrounding obstacle, and may calculate a maximum opening angle of the door for preventing collision with the surrounding obstacle based on the extracted coordinate information on the contour point and coordinate information on an end point of the door, corresponding to an opening angle of the door.

Here, the maximum opening angle of the door may be an opening angle immediately before the door collides with the surrounding obstacle.

When determining a risk of collision between the door and the surrounding obstacle, the determiner 220 may define the calculated maximum opening angle as a maximum value of a collision risk degree, and may set a threshold value of the collision risk degree based on the maximum value of the collision risk degree, and when an opening angle of a door is equal to or greater than a threshold value, the determiner 220 may determine that a risk of collision between the door and the surrounding obstacle is present.

As necessary, when the automatic parking system is operated, if the determiner 220 determines a risk of collision between the door and the surrounding obstacle, the determiner 220 may predict a position of a subject vehicle on which automatic parking is completed, may calculate a maximum opening angle of the door for preventing collision with the surrounding obstacle at the predicted position of the subject vehicle, and may determine a risk of collision between the door and the surrounding obstacle based on the calculated maximum opening angle.

Then, when determining that a risk of collision is present, the controller 230 may control an opening angle of the door at a safe angle to prevent the door from colliding with the surrounding obstacle as well as a warning horn.

As necessary, when the automatic parking system is executed, if the controller 230 determines that a risk of collision between the door and the surrounding obstacle at the position of the subject vehicle, which is predicted by the determiner 220, is present, the controller 230 may also provide notification indicating that a passenger is not capable of getting off or is allowed to previously get off.

As such, the door opening control apparatus 200 according to the present disclosure may include the recognizer 210, the determiner 220, and the controller 230.

Here, the recognizer 210 may determine a short-distance driving region using a free space of radars installed at a front side and rear side of the vehicle to extract a contour.

As such, the recognizer 210 may generate a free space-based occupancy grid map (OGM) from front and rear radars installed at four corners of the vehicle and may extract a contour of a stationary obstacle to recognize a surrounding obstacle.

Here, the recognizer 210 may separate sectors from a radar and may determine whether a vehicle is capable of driving in the sectors to extract a contour in order to determine a driving available region.

Then, the determiner 220 may recognize the driving available region, may calculate opening angles of all doors, may extract a maximum opening angle that is an opening angle immediately prior to collision, and may then determine whether each door is open at the maximum opening angle or greater.

When executing the automatic parking system, the determiner 220 may determine whether a region of a parking space that is checked based on the contour has a space for allowing a passenger to get off after a vehicle is parked.

As such, the determiner 220 may check the contour and may determine a maximum opening angle of each door with respect to the contour recognized at positions of the all doors of the vehicle.

The maximum opening angle is determined for each door because the maximum opening angle is different for each door.

The determiner 220 recognizes the maximum opening angle as an opening angle immediately prior to collision, and thus, may determine whether the door is open at the maximum opening angle or greater.

When the automatic parking system is executed, the determiner 220 may check the parking space and may then determine whether a space for allowing a passenger to get off after a vehicle is parked is formed by the opening angle of the door.

Then, when the passenger opens a door of a subject vehicle at the maximum opening angle or greater, the controller 230 may automatically limit an opening angle of the door and may generate a warning horn to indicate a current situation to a passenger and to prevent the vehicle door from being additionally open.

When the automatic parking system is executed, if a door opening angle corresponding to a space for allowing a passenger to get off after a vehicle is parked is not formed, the controller 230 may previously provide notification indicating that a passenger is allowed to previously get off or notification indicating that the passenger is not capable of getting off such that the passenger previously gets off.

As such, when each door is open at a maximum opening angle or greater, the controller 230 may limit additional opening of the door in addition to provision of a warning horn, thereby preventing collision between the door and the surrounding obstacle.

When the automatic parking system searches for a parking space and then pre-determines that the door is not open to allow the passenger to get off, the controller 230 may transmit pre-notification to the passenger.

Figure 3:
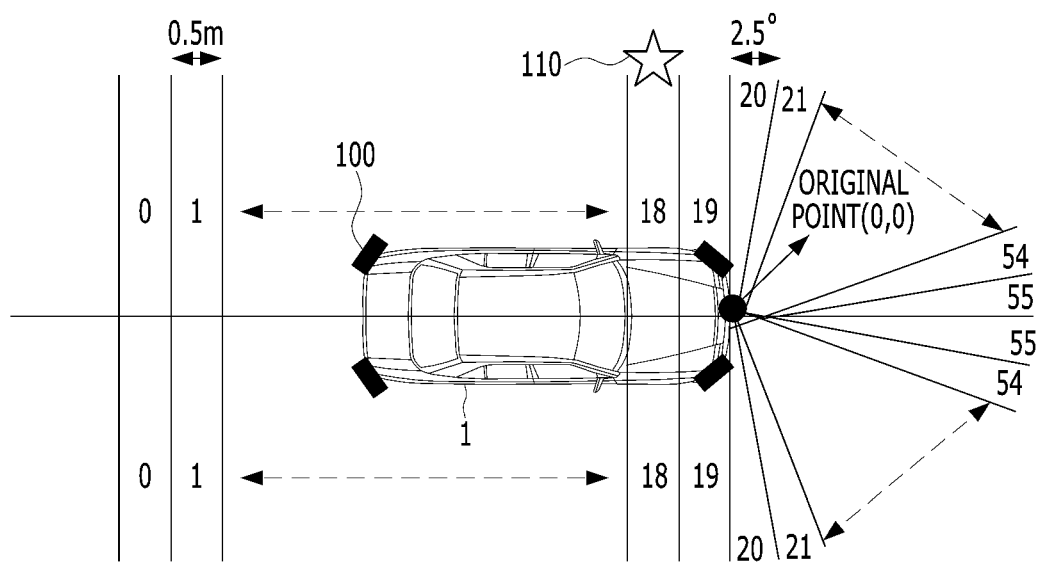
FIG. 3 is a diagram showing sectors of a radar detection region.

FIG. 3 is a diagram showing sectors of a radar detection region.

As shown in FIG. 3, the radar 100 may be installed at front side and rear side of the subject vehicle 1 and may sense a surrounding obstacle of the subject vehicle 1.

For example, the plurality of radars 100 may be classified into a first radar group positioned to the right of the subject vehicle and a second radar group positioned to the left of the subject vehicle based on a longitudinal reference line passing through the center of a bumper of the subject vehicle 1.

The first and second radar groups may have a detection region including sectors #0 to #55 but are the present disclosure is not limited thereto.

Here, among the sectors #0 to #55 in the detection region, sectors #0 to #19 may be separated at an interval of a distance of about 0.5 m and sectors #22 to #55 may be separated at an interval of an angle of about 2.5 degrees, but the present disclosure is not limited thereto.

As such, with regard to the front and rear radars according to the present disclosure, four radars may be installed at corners of the vehicle and may perform detection.

The four front and rear radars may detect total two groups that are obtained by dividing the vehicle into left and right sides.

Here, the left and right groups may each have sectors #0 to #55.

In addition, left and right groups may each be separated into 55 sectors, sectors #0 to #19 may be separated at an interval of a distance of about 0.5 m, and sectors #22 to #55 may be separated at an interval of an angle of about 2.5 degrees.

Then, information on a ranger of points detected by the radar is present, and thus, a position of a detection point 110 may be accurately recognized using a distance by which a sector is separated and a distance detected by the radar based on an original point (the center of a bumper of the vehicle).

For example, as shown in FIG. 3, when a position of the detection point 110, detected by the radar, is the center of #18, the range is basically distance information provided by the radar, and a last position (longitudinal/lateral position) may be determined further using information of the sector.

That is, the longitudinal position of the detection point 110 may be about 0.75 m, and a lateral direction of the detection point 110 may be calculated based on a distance, the longitudinal position, and width information of the vehicle.

FIGS. 4A to 4F are diagrams for explaining a procedure of generating a free space-based occupancy grid map (OGM). FIG. 5 is a diagram showing a cluster result based on an OGM.

As shown in FIGS. 4A to 4F, according to the present disclosure, sensor recognition information may be received from a plurality of radars, a free space-based occupancy grid map (OGM) may be generated based on the sensor recognition information, and a contour of a stationary obstacle may be extracted from the OGM to recognize a surrounding obstacle.

Here, according to the present disclosure, when the OGM is generated, a region around the subject vehicle may be converted into a map including grids with a predetermined size and the OGM may be generated.

For example, according to the present disclosure, when the size of the region around the subject vehicle is about 10 m×about 10 m, the region may be converted into grids with a size of about 0.25 m×about 0.25 m and the OGM may be generated.

Here, since a free space of a radar is based on an angle, the accuracy thereof is reduced as a distance from the subject vehicle is increased, and thus, a reference of the size of the region around the subject vehicle may be limited to about 10 m.

As shown in FIG. 5, according to the present disclosure, when a contour is extracted, grids having a predetermined threshold value may be clustered and the grids may be grouped to one set based on a probability reference of the OGM, and grids corresponding to one grouping target may be connected to each other and the contour of the stationary obstacle may be extracted.

That is, according to the present disclosure, grids having a predetermined threshold value may be clustered and the grids may be grouped to one set based on a probability reference of the generated OGM.

Figure 4A:
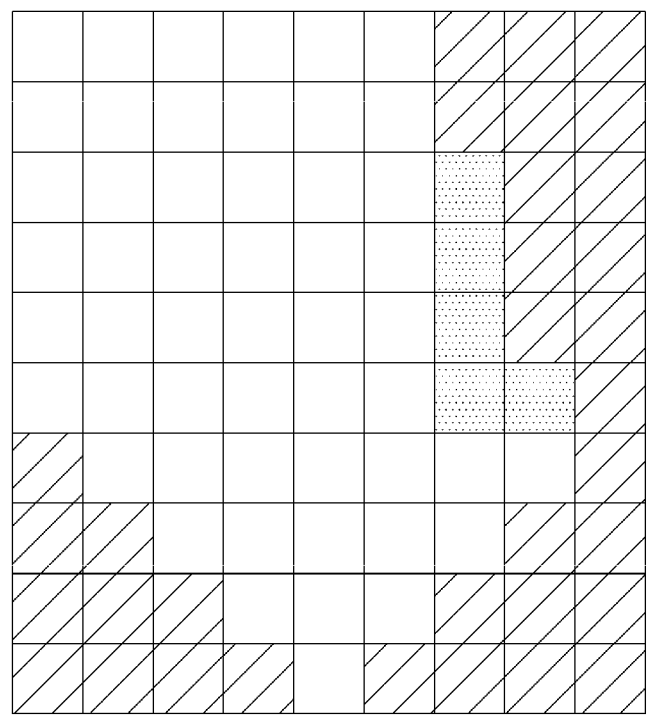
FIGS. 4A to 4F are diagrams for explaining a procedure of generating a free space-based occupancy grid map (OGM)
Figure 4B:
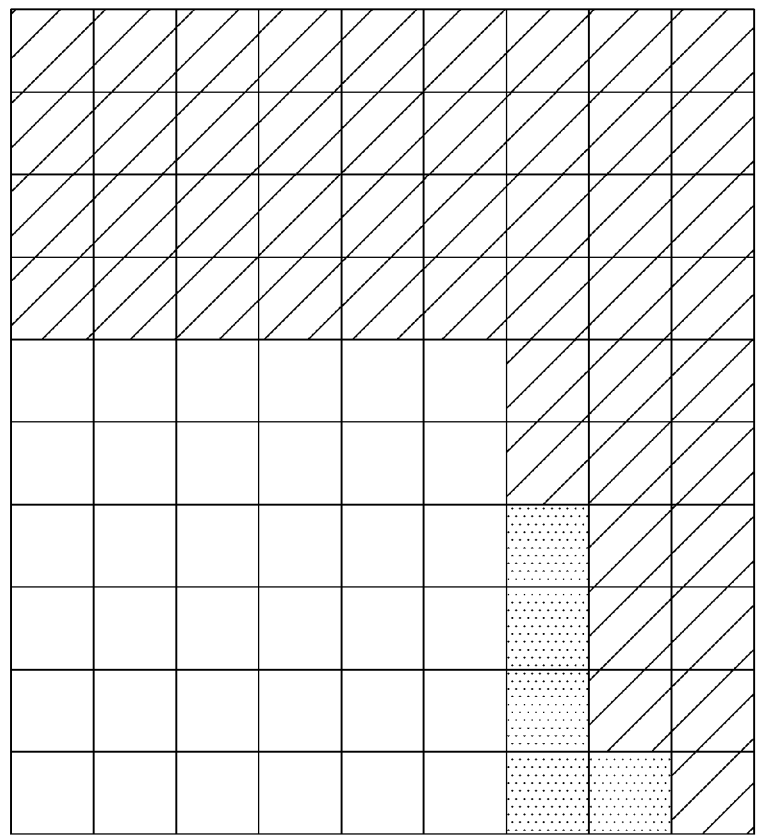
Figure 4C:
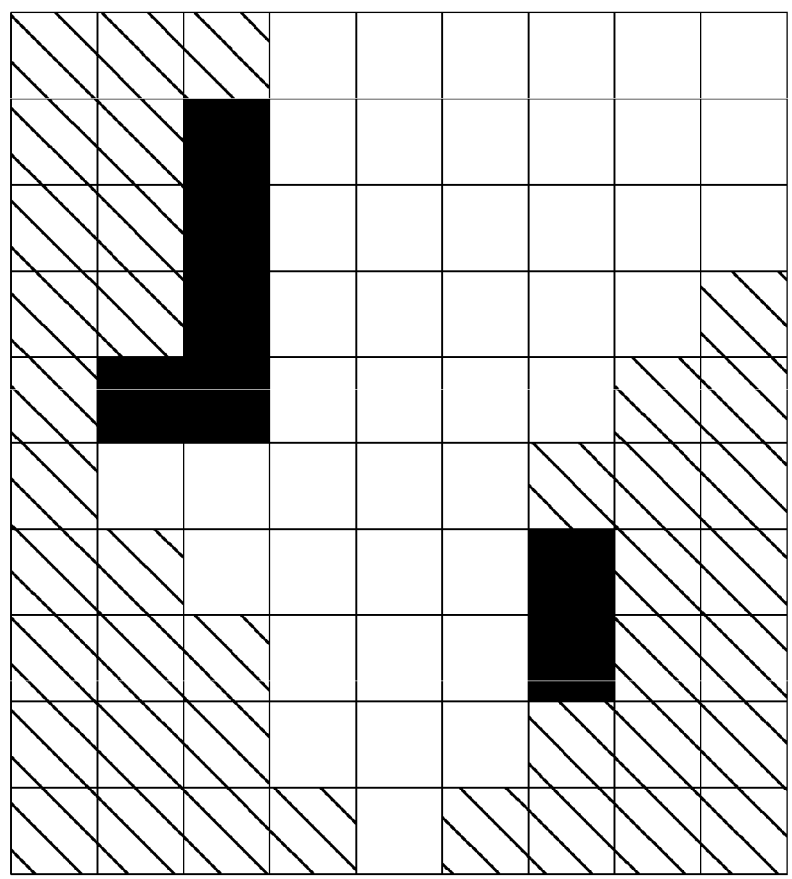
Figure 4D:
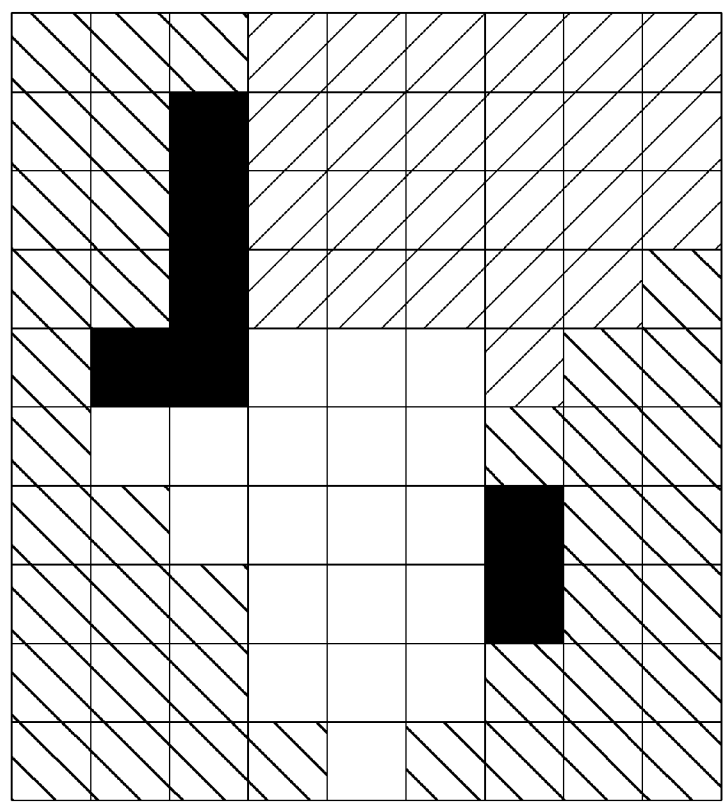
Figure 4E:
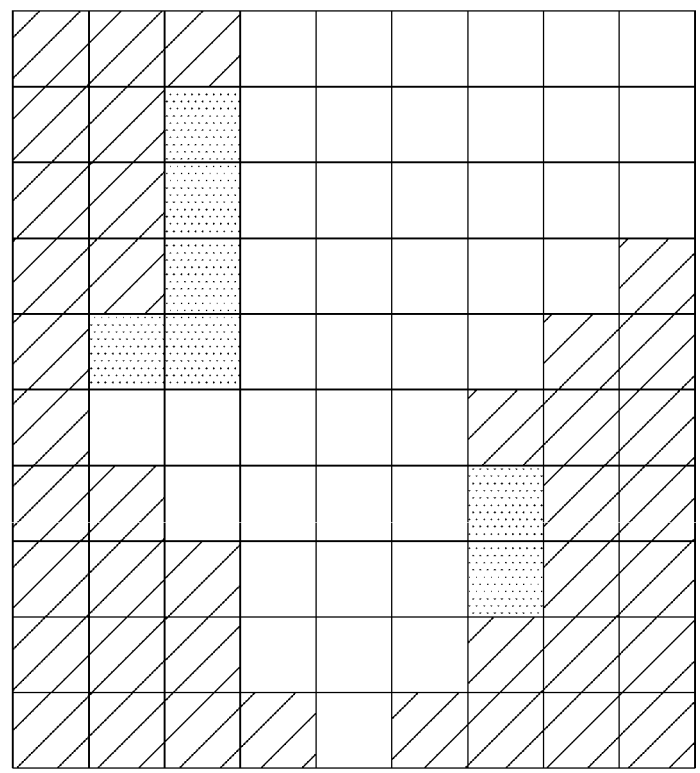
Figure 4F:
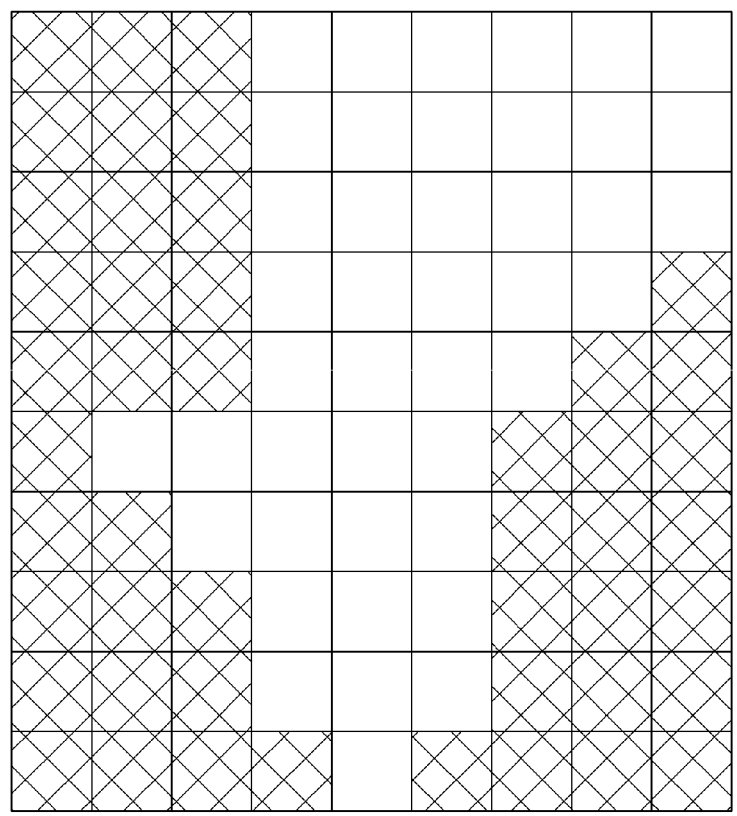
Figure 5:
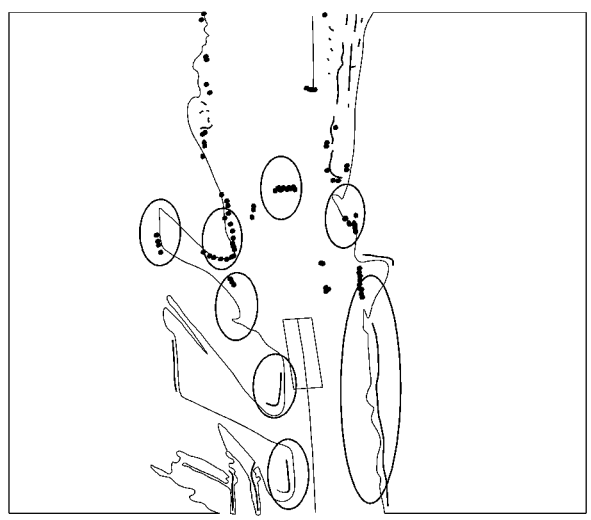
FIG. 5 is a diagram showing a cluster result based on an OGM.

FIG. 4A is a diagram showing an OGM at a time t−1. FIG. 4B is a diagram showing movement of a grip map at a time t−1 using movement of a subject vehicle and steering information. FIG. 4C is a diagram showing a grip map at a time t, which is written through ray casting. FIG. 4D is a diagram showing the case in which a grip map at a time t is applied to an OGM at a time t−1 to be updated. FIG. 4E is a diagram showing an OGM at a time t. FIG. 4F is a diagram showing a binary OGM using cells having an occupancy value with a predetermined level or greater.

As shown in FIGS. 4A to 4F, according to the present disclosure, grids corresponding to one grouping target may be connected to each other and a contour may be extracted.

Here, all coordinates of contours that connect the grids corresponding to a grouping target may be recognized using the center of a bumper of the vehicle as an original point.

Figure 6:
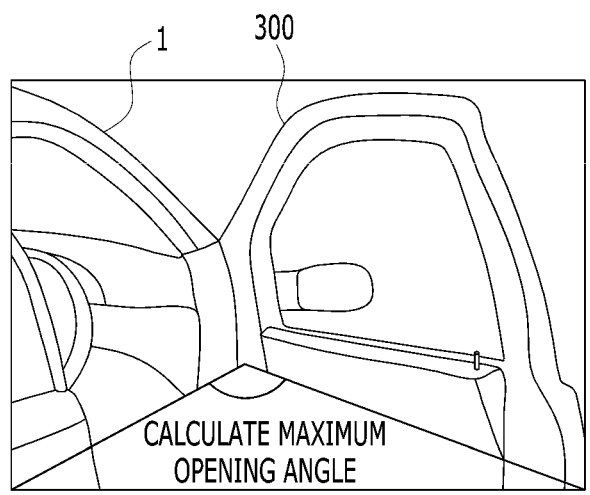
FIG. 6 is a diagram showing a maximum opening angle of a door.
Figure 7:
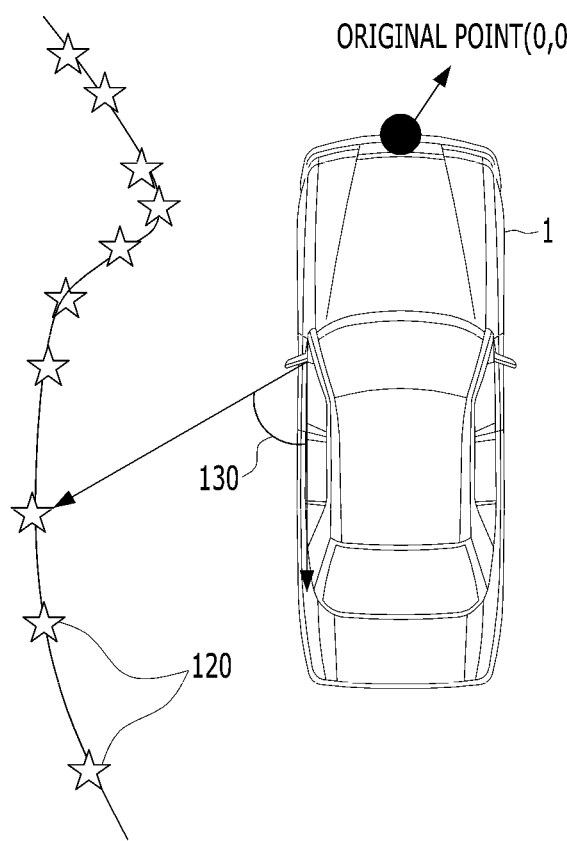
FIG. 7 is a diagram showing a contour with respect to a stationary obstacle and a door opening coordinate.
Figure 8:
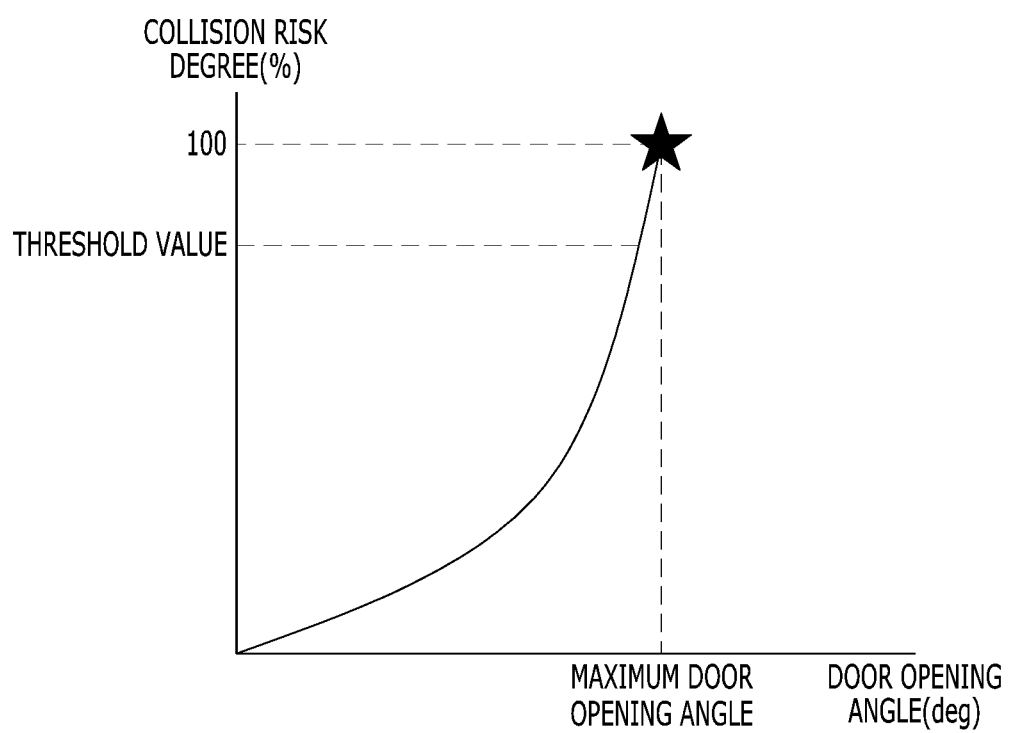
FIG. 8 is a graph showing a collision risk degree for determination of a maximum opening angle of a door.

FIG. 6 is a diagram showing a maximum opening angle of a door. FIG. 7 is a diagram showing a contour with respect to a stationary obstacle and a door opening coordinate. FIG. 8 is a graph showing a collision risk degree for determination of a maximum opening angle of a door.

As shown in FIGS. 6 and 7, according to the present disclosure, when a maximum opening angle of the door 300 of the subject vehicle 1 is calculated, coordinate information of a contour point 120 may be extracted from a contour of a surrounding obstacle, and a maximum opening angle of the door 300 for preventing collision with a surrounding obstacle may be calculated based on the extracted coordinate information of the contour point 120 and coordinate information on an end point of the door 300 corresponding to an opening angle 130 of the door 300.

Here, the maximum opening angle of the door may be an opening angle immediately before the door collides with the surrounding obstacle.

As shown in FIG. 8, according to the present disclosure, when determining a risk of collision between the door 300 and the surrounding obstacle, the calculated maximum opening angle may be defined as a maximum value of a collision risk degree, a threshold value of the collision risk degree may be set based on the maximum value of the collision risk degree, and when an opening angle of a door is equal to or greater than a threshold value, it may be determined that a risk of collision between the door and the surrounding obstacle is present.

According to the present disclosure, a coordinate of each contour point 120 may be recognized, and a coordinate of an end point of the door based on the opening angle of the door may be predicted in a fixed coordinate of the vehicle door.

As shown in FIG. 7, all the contour points 120 have coordinates (X,Y), and thus, according to the present disclosure, the contour points 120 may be connected to each other to form contour information.

According to the present disclosure, a coordinate of a point at which the door is open to the maximum may be predicted based on a door opening angle at a coordinate of a fixed vehicle door.

Thus, according to the present disclosure, a coordinate of an end point of the door is changed depending on an opening angle of the door, and thus, the coordinate of the end point of the door may be continuously compared with a coordinate of a contour of an obstacle to determine collision between the door and the obstacle.

Then, according to the present disclosure, when a passenger opens the door at an approximately maximum opening angle, the collision risk degree may be defined as 100 and a risk of collision may be determined.

As shown in FIG. 8, according to the present disclosure, when a contour coordinate and an opening coordinate of a door of a vehicle are determined, a risk of collision may be determined based on a collision risk degree having a threshold value.

That is, according to the present disclosure, a surrounding situation is different for each door, and thus, a situation may be separately determined for each door and a door opening degree may be determined.

Figure 9:
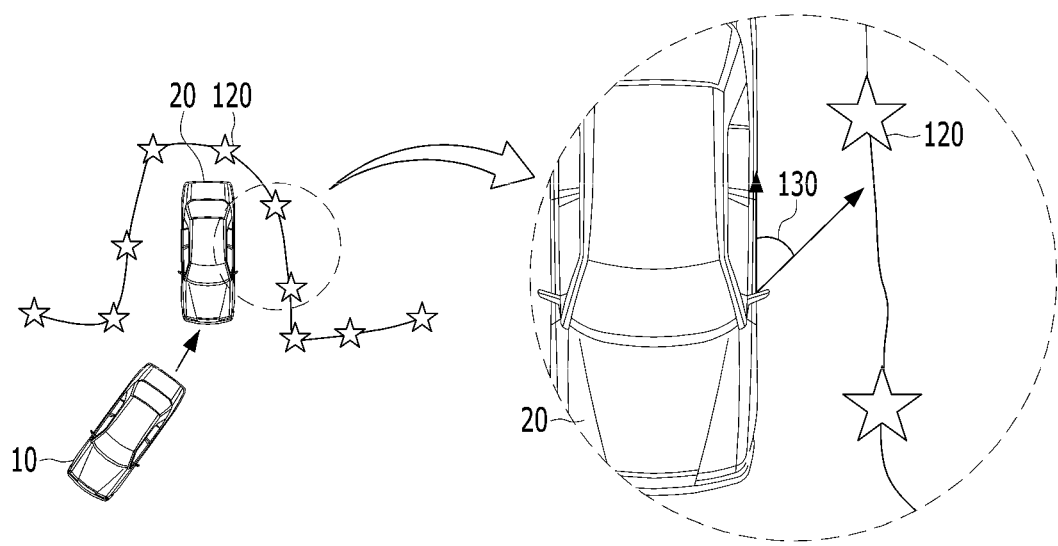
FIG. 9 is a diagram showing determination of a maximum opening angle of a door in an automatic parking system.

FIG. 9 is a diagram showing determination of a maximum opening angle of a door in an automatic parking system.

As shown in FIG. 9, according to the present disclosure, when an automatic parking system is executed, if a risk of collision between the door and the surrounding obstacle is determined, a position of a subject vehicle on which automatic parking is completed may be predicted, a maximum opening angle of a door for preventing collision with a surrounding obstacle at the predicted position of the subject vehicle may be calculated, and a risk of collision between the door and the surrounding obstacle may be determined based on the calculated maximum opening angle.

That is, according to the present disclosure, when the automatic parking system is executed at a current position of a subject vehicle 10, a contour of an obstacle may be checked, and a door opening degree at a predicted position of a subject vehicle 20 after a vehicle is parked may be determined.

As shown in FIG. 9, according to the present disclosure, a position of the subject vehicle 20 after automatic parking is completed, and a coordinate of the contour point 120 at the predicted position of the subject vehicle 20 may be compared with a coordinate of the door of the subject vehicle 20 to predict the opening angle 130 of the door.

Figure 10:
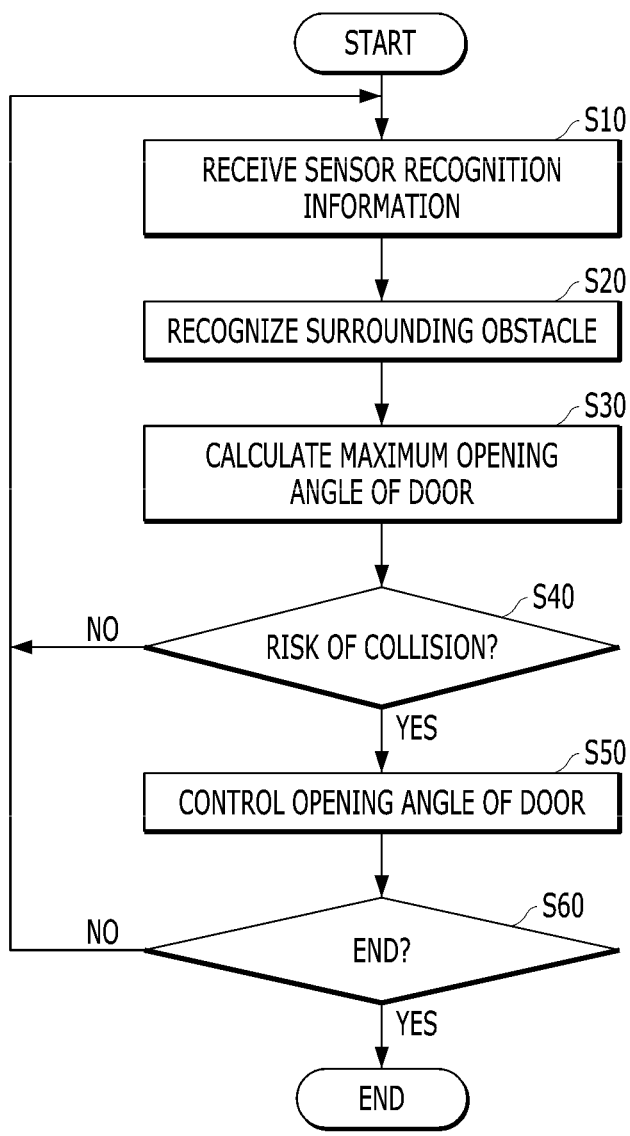
FIG. 10 is a flowchart for explaining a door opening control method of a door opening control apparatus in one form of the present disclosure.

FIG. 10 is a flowchart for explaining a door opening control method of a door opening control apparatus in some forms of the present disclosure.

As shown in FIG. 10, according to the present disclosure, sensor recognition information may be received from a plurality of sensors.

Here, according to the present disclosure, when sensor recognition information is received, the sensor recognition information may be received from a plurality of radars installed at a front side and rear side of the subject vehicle.

According to the present disclosure, the surrounding obstacle may be recognized based on the sensor recognition information received from the plurality of sensors.

Here, according to the present disclosure, when the surrounding obstacle is recognized, a free space-based occupancy grid map (OGM) may be generated based on the sensor recognition information, a contour of a stationary obstacle may be extracted from the OGM, and the surrounding obstacle may be recognized.

In this case, according to the present disclosure, when the OGM is generated, a region around the subject vehicle may be converted into a map including grids with a predetermined size and the OGM may be generated.

For example, according to the present disclosure, when the size of the region around the subject vehicle is about 10 m×about 10 m, the region may be converted into grids with a size of about 0.25 m×about 0.25 m and the OGM may be generated.

According to the present disclosure, when a contour is extracted, grids having a predetermined threshold value may be clustered and the grids may be grouped to one set based on a probability reference of the OGM, and grids corresponding to one grouping target may be connected to each other and the contour of the stationary obstacle may be extracted.

In some forms of the present disclosure, when the surrounding obstacle is recognized, a free space-based occupancy grid map (OGM) may be generated based on the sensor recognition information, a position of a subject vehicle on which automatic parking is completed may be predicted, a contour of a stationary obstacle at the predicted position of the subject position may be extracted from the OGM, and the surrounding obstacle at the predicted position of the subject vehicle may be predicted.

Then, according to the present disclosure, a maximum opening angle of the door for preventing collision with the recognized surrounding obstacle may be calculated.

Here, according to the present disclosure, when a maximum opening angle of a door is calculated, coordinate information of a contour point may be extracted from a contour of a surrounding obstacle, and a maximum opening angle of the door for preventing collision with a surrounding obstacle may be calculated based on the extracted coordinate information of the contour point and coordinate information on an end point of the door corresponding to an opening angle of the door.

Then, according to the present disclosure, a risk of collision between the door and the surrounding obstacle may be determined based on the calculated maximum opening angle.

Here, according to the present disclosure, when a risk of collision between the door and the surrounding obstacle is determined, the calculated maximum opening angle may be defined as a maximum value of a collision risk degree, a threshold value of the collision risk degree may be set based on the maximum value of the collision risk degree, and when an opening angle of a door is equal to or greater than a threshold value, it may be determined that a risk of collision between the door and the surrounding obstacle is present.

In some forms of the present disclosure, when a risk of collision between the door and the surrounding obstacle is determined, a position of a subject vehicle on which automatic parking is completed may be predicted, a maximum opening angle of a door for preventing collision with a surrounding obstacle at the predicted position of the subject vehicle may be calculated, and a risk of collision between the door and the surrounding obstacle may be determined based on the calculated maximum opening angle.

Then, according to the present disclosure, when a risk of collision is determined, an opening angle of the door may be controlled to prevent the door from colliding with the surrounding obstacle.

Here, according to the present disclosure, when the opening angle of the door is controlled, if it is determined that a risk of collision is present, an opening angle of the door may be controlled at a safe angle to prevent the door from colliding with the surrounding obstacle as well as a warning horn.

In some forms of the present disclosure, when the opening angle of the door is controlled, a position of a subject vehicle on which automatic parking is completed may be predicted, and when it is determined that a risk of collision between the door and the surrounding obstacle is present at the predicted position of the subject vehicle, notification indicating that a passenger is not capable of getting off or notification indicating that the passenger is allowed to previously get off may be provided.

According to the present disclosure, a computer readable medium on which a program for performing a door opening control method of a door opening control apparatus may perform procedures provided by the door opening control method of the door opening control apparatus.

As such, according to the present disclosure, a risk of collision between a door and a surrounding obstacle may be determined based on a maximum opening angle of the door for preventing collision with the surrounding obstacle and an opening angle of the door may be controlled, thereby preventing collision with the surrounding obstacle as the door of the subject vehicle is open.

According to the present disclosure, when a surrounding situation is accurately recognized using a free space of a conventional radar and a passenger opens a door up to a time point at which collision between the door and an obstacle occurs when the passenger gets off, additional opening of the door may be automatically limited together a warning horn prior to the time point at which collision is predicted, thereby preventing the vehicle from being damaged.

According to the present disclosure, when the automatic parking system is operated, if it is determined that it is difficult to allow a passenger to get off after the vehicle is parked, notification indicating that the vehicle is supposed to be parked after the passenger gets off or notification indicating that it is difficult to allow the passenger to get off after the vehicle is parked may be provided, thereby enhancing convenience.

The door opening control apparatus and the door opening control method thereof in some forms of the present disclosure as configured above may determine a risk of collision between a door and a surrounding obstacle and may control an opening angle of the door based on a maximum opening angle of the door for preventing collision with the surrounding obstacle, thereby preventing collision with the surrounding obstacle as the door of the subject vehicle is open.

According to the present disclosure, when a surrounding situation is accurately recognized using a free space of a conventional radar and a passenger opens a door up to a time point at which collision between the door and an obstacle occurs when the passenger gets off, additional opening of the door may be automatically limited together a warning horn prior to the time point at which collision is predicted, thereby preventing the vehicle from being damaged.

According to the present disclosure, when the automatic parking system is operated, if it is determined that it is difficult to allow a passenger to get off after the vehicle is parked, notification indicating that the vehicle is supposed to be parked after the passenger gets off or notification indicating that it is difficult to allow the passenger to get off after the vehicle is parked may be provided, thereby enhancing convenience.

It will be appreciated by persons skilled in the art that that the effects that could be achieved with the present disclosure are not limited to what has been particularly described hereinabove and other advantages of the present disclosure will be more clearly understood from the detailed description.

Some forms of the present disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling door opening, the apparatus comprising:

a recognizer configured to recognize a surrounding obstacle based on sensor recognition information received from a plurality of sensors;

a determiner configured to:
- calculate a maximum opening angle of a door for preventing collision with the recognized surrounding obstacle; and
- determine a risk of collision between the door and the surrounding obstacle based on the calculated maximum opening angle; and a controller configured to control an opening angle of the door to prevent the door from colliding with the surrounding obstacle when the risk of collision is determined to be present;

wherein, when recognizing the surrounding obstacle, the recognizer is configured to:
- receive the sensor recognition information from the plurality of sensors;
- generate a free space-based occupancy grid map (OGM) based on the sensor recognition information;
- predict a position of a subject vehicle on which automatic parking is completed;
- extract a contour of a stationary obstacle at the predicted position of the subject position from the OGM; and
- recognize the surrounding obstacle at the predicted position of the subject vehicle.

2. The apparatus of claim 1, wherein, when extracting the contour, the recognizer is configured to:
- cluster grids having a predetermined threshold value;
- group the grids to one set based on the OGM; and
- connect grids corresponding to one grouping target to each other to extract the contour of the stationary obstacle.

3. The apparatus of claim 1, wherein, when calculating the maximum opening angle of the door, the determiner is configured to:
- extract coordinate information of a contour point from the contour of the surrounding obstacle;
- calculate the maximum opening angle of the door for preventing collision with the surrounding obstacle based on the extracted coordinate information; and
- coordinate information of an end point of the door corresponding to an opening angle of the door.

4. The apparatus of claim 1, wherein, when determining the risk of collision between the door and the surrounding obstacle, the determiner is configured to:
- define the calculated maximum opening angle as a maximum value of a collision risk degree;
- set a threshold value of the collision risk degree based on the maximum value of the collision risk degree; and
- when the opening angle of the door is equal to or greater than the threshold value, determine that the risk of collision between the door and the surrounding obstacle is present.

5. The apparatus of claim 1, wherein, when determining the risk of collision between the door and the surrounding obstacle, the determiner is configured to:
- predict a position of the subject vehicle on which automatic parking is completed;
- calculate a maximum opening angle of the door for preventing collision with the surrounding obstacle at the predicted position of the subject vehicle; and
- determine the risk of collision between the door and the surrounding obstacle based on the calculated maximum opening angle.

6. The apparatus of claim 1, wherein, when determining that the risk of collision is present, the controller is configured to control an opening angle of the door at a predetermined angle to prevent the door from colliding with the surrounding obstacle and to provide a warning horn.

7. The apparatus of claim 1, wherein, when determining that the risk of collision between the door and the surrounding obstacle at the predicted position of the subject vehicle is present, the controller is configured to provide a notification indicating that a passenger is not allowed to exit currently or that the passenger is allowed to exit in advance.

8. A method of controlling door opening, the method comprising:
- recognizing a surrounding obstacle based on sensor recognition information received from a plurality of sensors;
- calculating a maximum opening angle of a door for preventing collision with the recognized surrounding obstacle;
- determining a risk of collision between the door and the surrounding obstacle based on the calculated maximum opening angle; and
- controlling an opening angle of the door to prevent the door from colliding with the surrounding obstacle when the risk of collision is determined to be present, wherein recognizing the surrounding obstacle comprises:
- receiving the sensor recognition information from the plurality of sensors;
- generating a free space-based occupancy grid map (OGM) based on the sensor recognition information;
- predicting a position of a subject vehicle on which automatic parking is completed; and
- extracting a contour of a stationary obstacle at the predicted position of the subject position from the OGM and recognizing the surrounding obstacle at the predicted position of the subject vehicle.

9. The method of claim 8, wherein extracting the contour comprises:
- clustering grids having a predetermined threshold value and grouping the grids to one set based on the OGM; and
- connecting grids corresponding to one grouping target to each other to extract the contour of the stationary obstacle.

10. The method of claim 8, wherein calculating the maximum opening angle of the door comprises:
- extracting coordinate information of a contour point from the contour of the surrounding obstacle; and
- calculating the maximum opening angle of the door for preventing collision with the surrounding obstacle based on the extracted coordinate information and coordinate information of an end point of the door corresponding to an opening angle of the door.

11. The method of claim 8, wherein determining the risk of collision between the door and the surrounding obstacle comprises:
- defining the calculated maximum opening angle as a maximum value of a collision risk degree;
- setting a threshold value of the collision risk degree based on the maximum value of the collision risk degree; and
- when the opening angle of the door is equal to or greater than the threshold value, determining that the risk of collision between the door and the surrounding obstacle is present.

12. The method of claim 8, wherein determining the risk of collision between the door and the surrounding obstacle comprises:

predicting a position of the subject vehicle on which automatic parking is completed;

calculating a maximum opening angle of the door for preventing collision with the surrounding obstacle at the predicted position of the subject vehicle; and determining the risk of collision between the door and the surrounding obstacle based on the calculated maximum opening angle.

13. The method of claim 8, wherein controlling the opening angle of the door comprises, when the risk of collision is determined to be present, controlling an opening angle of the door at a predetermined angle to prevent the door from colliding with the surrounding obstacle and to provide a warning horn.

14. The method of claim 8, wherein controlling the opening angle of the door comprises, when predicting a position of the subject vehicle on which automatic parking is completed and determining that the risk of collision between the door and the surrounding obstacle at the predicted position of the subject vehicle is present, providing a notification indicating that a passenger is not allowed to exit currently or that the passenger is allowed to exit in advance.

15. A computer-readable recording medium having a program recorded thereon, the program to direct a processor to perform acts of:

recognizing a surrounding obstacle based on sensor recognition information received from a plurality of sensors;

calculating a maximum opening angle of a door for preventing collision with the recognized surrounding obstacle;

determining a risk of collision between the door and the surrounding obstacle based on the calculated maximum opening angle; and controlling an opening angle of the door to prevent the door from colliding with the surrounding obstacle when the risk of collision is determined to be present, wherein recognizing the surrounding obstacle comprises:
receiving the sensor recognition information from the plurality of sensors;
generating a free space-based occupancy grid map (OGM) based on the sensor recognition information;
predicting a position of a subject vehicle on which automatic parking is completed; and
extracting a contour of a stationary obstacle at the predicted position of the subject position from the OGM and recognizing the surrounding obstacle at the predicted position of the subject vehicle.

16. A vehicle comprising:
a radar configured to sense a surrounding obstacle of the vehicle; and
a door opening control apparatus comprising:
a recognizer configured to recognize the surrounding obstacle based on sensor recognition information received from the radar;
a determiner configured to:
calculate a maximum opening angle of the door for preventing collision with the recognized surrounding obstacle; and
determine a risk of collision between the door and the surrounding obstacle based on the calculated maximum opening angle; and
a controller configured to control an opening angle of the door to prevent the door from colliding with the surrounding obstacle when determining that the risk of collision is present;
wherein, when recognizing the surrounding obstacle, the recognizer is configured to:
receive the sensor recognition information from the radar;
generate a free space-based occupancy grid map (OGM) based on the sensor recognition information;
predict a position of the vehicle on which automatic parking is completed;
extract a contour of a stationary obstacle at the predicted position of the position from the OGM; and
recognize the surrounding obstacle at the predicted position of the vehicle.

17. The vehicle of claim 16, wherein, when calculating the maximum opening angle of the door, the determiner is configured to: extract coordinate information of a contour point from the contour of the surrounding obstacle;
calculate the maximum opening angle of the door for preventing collision with the surrounding obstacle based on the extracted coordinate information; and
coordinate information of an end point of the door corresponding to an opening angle of the door.

18. The vehicle of claim 16, wherein, when determining the risk of collision between the door and the surrounding obstacle, the determiner is configured to:
define the calculated maximum opening angle as a maximum value of a collision risk degree;
set a threshold value of the collision risk degree based on the maximum value of the collision risk degree; and
when the opening angle of the door is equal to or greater than the threshold value, determine that the risk of collision between the door and the surrounding obstacle is present.

19. The vehicle of claim 16, wherein, when determining the risk of collision between the door and the surrounding obstacle, the determiner is configured to:
predict a position of the vehicle on which automatic parking is completed;
calculate a maximum opening angle of the door for preventing collision with the surrounding obstacle at the predicted position of the vehicle; and
determine the risk of collision between the door and the surrounding obstacle based on the calculated maximum opening angle.

20. The vehicle of claim 16, wherein, when determining that the risk of collision is present, the controller is configured to control an opening angle of the door at a predetermined angle to prevent the door from colliding with the surrounding obstacle and to provide a warning horn.

* * * * *